US012354534B1

(12) United States Patent
Tang et al.

(10) Patent No.: US 12,354,534 B1
(45) Date of Patent: Jul. 8, 2025

(54) DRIVING DEVICE AND DISPLAY DRIVING METHOD FOR LIGHT-EMITTING DIODE ARRAY

(71) Applicant: Novatek Microelectronics Corp., Hsinchu (TW)

(72) Inventors: Yu-Shun Tang, Hsinchu County (TW); Siao-Siang Liu, Hsinchu County (TW); Shih-Hsuan Huang, Keelung (TW)

(73) Assignee: Novatek Microelectronics Corp., Hsinchu (TW)

( * ) Notice: Subject to any disclaimer, the term of this patent is extended or adjusted under 35 U.S.C. 154(b) by 29 days.

(21) Appl. No.: 18/583,796

(22) Filed: Feb. 21, 2024

(51) Int. Cl.
*G09G 3/32* (2016.01)
*G09G 3/20* (2006.01)

(52) U.S. Cl.
CPC ............. *G09G 3/32* (2013.01); *G09G 3/2022* (2013.01); *G09G 2310/0297* (2013.01); *G09G 2320/0247* (2013.01); *G09G 2340/0435* (2013.01)

(58) Field of Classification Search
CPC ................... G09G 3/32; G09G 3/2022; G09G 2310/0297; G09G 2340/0435
See application file for complete search history.

(56) References Cited

U.S. PATENT DOCUMENTS 11,398,177 B2 7/2022 Tseng et al.
2002/0017962 A1* 2/2002 Takagi ..................... H03K 7/10 332/109
2005/0073516 A1 4/2005 Kang
2006/0238943 A1* 10/2006 Awakura ............. G09G 3/3258 361/93.1
2018/0047346 A1 2/2018 Xing et al.
2021/0118358 A1* 4/2021 Lee ...................... G09G 3/2014
2021/0366345 A1 11/2021 Tseng et al.
2022/0375388 A1 11/2022 Kim et al.

FOREIGN PATENT DOCUMENTS

CN 102779480 11/2012
CN 116129794 5/2023
CN 112992054 B * 8/2023 ............... G09G 3/32
TW 202145191 12/2021

OTHER PUBLICATIONS

"Office Action of Taiwan Counterpart Application", issued on Feb. 17, 2025, p. 1-p. 3.

* cited by examiner

*Primary Examiner* — Doon Y Chow
(74) *Attorney, Agent, or Firm* — JCIPRNET

(57) ABSTRACT

The driving device includes a starting-position adjustment circuit and a pulse-width modulation (PWM) circuit. The starting-position adjustment circuit shifts a PWM counting value according to a starting-position setting to generate an adjusted counting value of a first channel. The starting-position setting is configured to indicate which subframe period in a same display frame period a starting value of the adjusted counting value is located in. The PWM circuit compares grayscale data of the first channel with the adjusted counting value and generates a PWM signal of the first channel according to a comparison result.

16 Claims, 8 Drawing Sheets

DRIVING DEVICE AND DISPLAY DRIVING METHOD FOR LIGHT-EMITTING DIODE ARRAY

BACKGROUND

Technical Field

The disclosure relates to a display device, and particularly relates to a driving device and a display driving method for a light-emitting diode (LED) array.

Description of Related Art

Today's light-emitting diode (LED) displays mainly use pulse-width modulation (PWM) signals to control driving currents of the LED for achieving grayscale changes. In terms of reducing the flicker of the LED display panel and improving the image stability, the higher the refresh rate of the LED, the better. In order to increase the refresh rate of the LED, each display frame period is divided into a plurality of subframe periods, and a duty width of a PWM signal in the display frame period is segmented into a plurality of subframes. Therefore, the LED pixels can be lit up a plurality of times in different subframe periods (a plurality of time intervals) of a display frame period. Based on this, the refresh rate of the LED can be increased without changing the frequency of the display frame (the refresh rate is the picture update rate multiplied by the number of subframes).

At a low grayscale, the duty width of the PWM signal in a display frame period is too narrow such that the duty width indicating the low grayscale is not sufficient to be segmented in all subframes. In extreme cases, the duty width indicating the lowest grayscale can only be placed in a first subframe period of a display frame period. Assuming that all LED pixels are at the lowest grayscale, each LED pixel will only be lit up in the first subframe period of each display frame period (the time length corresponds to the lowest grayscale), and will not be lit up in other subframe periods in each display frame. Therefore, at the low grayscale, the refresh rate of the LED will be reduced. In addition, since the starting positions of all LED pixels in each display frame period is the same, and the starting position of any LED pixel remains the same in different display frames, each LED (the lowest grayscale) will light up in the same subframe period such that the picture will have flicker and horizontal and vertical lines. Therefore, how to improve the visual effect of the low grayscale has become an important issue.

It should be noted that the content of the "Related Art" section is used to help understand the disclosure. Some of the content (or all of the content) disclosed in the "Related Art" section may not be known by those of ordinary skill in the art. The content disclosed in the "Related Art" section does not mean that the content has been known to those with ordinary knowledge in the technical field before the application of the disclosure.

SUMMARY

The disclosure provides a driving device and a display driving method to drive a light-emitting diode (LED) array.

In an embodiment of the disclosure, a driving device includes a starting-position adjustment circuit and a pulse-width modulation (PWM) circuit. The starting-position adjustment circuit receives a pulse-width modulation counting value. The starting-position adjustment circuit is configured to shift the pulse-width modulation counting value according to a first starting-position setting to generate a first adjusted counting value of a first channel. Each display frame period is divided into a plurality of subframe periods. Each subframe period includes a plurality of scan line times corresponding to a plurality of scan lines of a light-emitting diode array, and the first starting-position setting is configured to indicate which subframe period in a same display frame period a starting value of the first adjusted counting value is located in. The pulse-width modulation circuit is coupled to the starting-position adjustment circuit to receive the first adjusted counting value. The pulse-width modulation circuit compares grayscale data of the first channel with the first adjusted counting value. The pulse-width modulation circuit generates a first pulse-width modulation signal of the first channel according to a comparison result.

In an embodiment of the disclosure, a display driving method includes the following steps. A first adjusted counting value of a first channel is generated by a starting-position adjustment circuit to shift a pulse-width modulation counting value according to a first starting-position setting. Grayscale data of the first channel is compared with the first adjusted counting value by the pulse-width modulation circuit to obtain a comparison result. A first pulse-width modulation signal of the first channel is generated by the pulse-width modulation circuit according to the comparison result.

Based on the above, the starting-position adjustment circuit described in an embodiment of the disclosure can disperse the starting positions of different LED pixels in the same display frame period, and/or disperse the starting position of a same LED pixel in different display frame periods. Therefore, at a low grayscale, LED pixels at different positions can be lit up in different subframe periods of the same display frame period, and/or the same LED pixel can be lit up in different subframe periods of different display frame periods, so as to reduce the flicker and the horizontal and vertical lines.

In order to make the above-mentioned features and advantages of the disclosure clearer and easier to understand, the following embodiments are given and described in details with accompanying drawings as follows.

DESCRIPTION OF THE EMBODIMENTS

Figure 1:
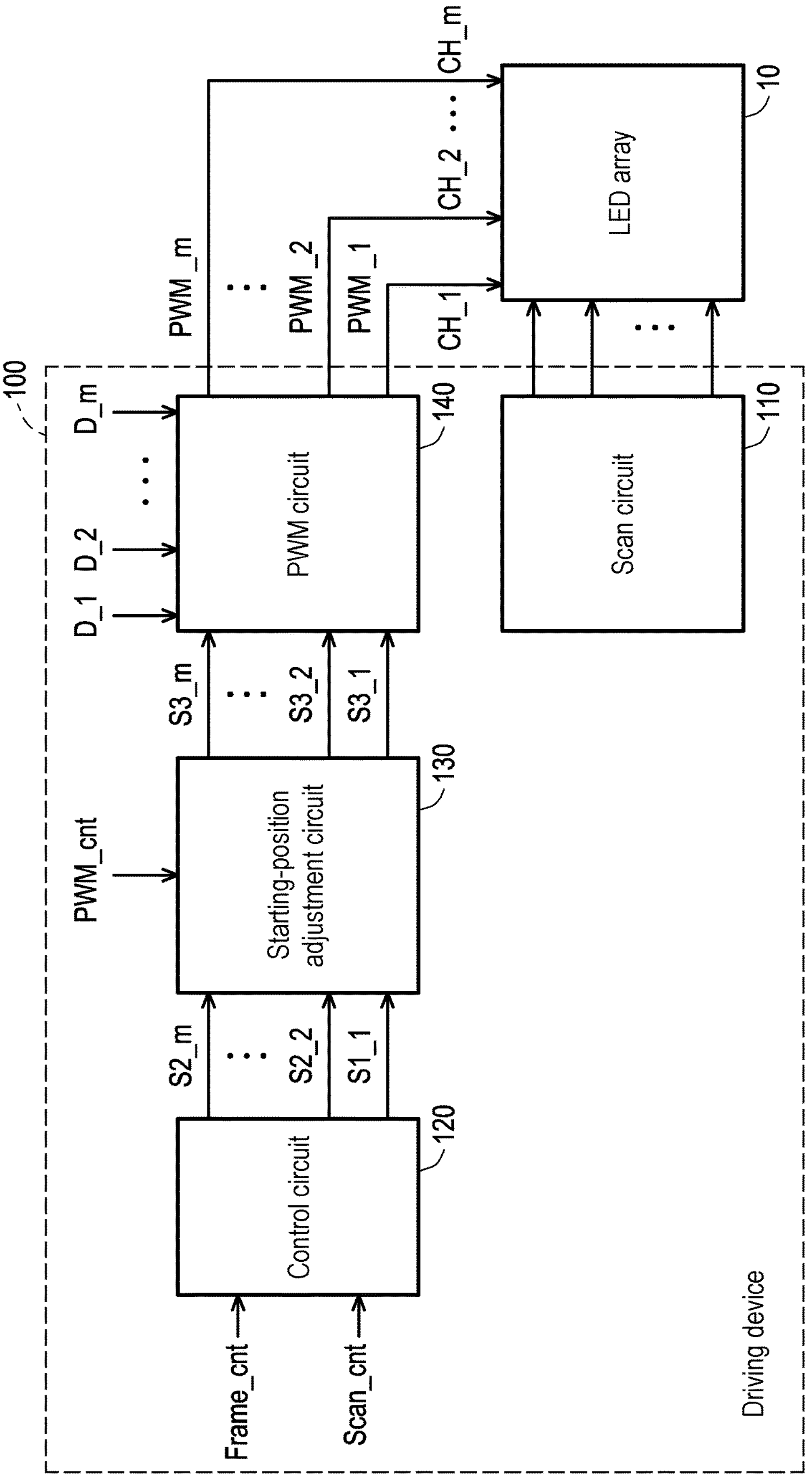
FIG. 1 is a circuit block schematic diagram of a driving device for a light-emitting diode (LED) array according to an embodiment of the disclosure.

The term "coupling (or connecting)" used in this specification (including the claims) may refer to any direct or indirect connection means. For example, "a first device is coupled (or connected) to a second device" should be interpreted as "the first device is directly connected to the second device" or "the first device is indirectly connected to the second device through other devices or some connection means. The terms "first" and "second" mentioned throughout the specification (including the claims) serve to name elements or to distinguish different embodiments or ranges, and not to limit the upper or lower bound of the number of elements nor to limit the sequence of elements. In addition, wherever possible, elements/components/steps using same reference numerals in the drawings and embodiments refer to the same or similar parts. Cross-reference may be made to related descriptions for elements/components/steps using the same reference numerals or using the same terms in different embodiments.

FIG. 1 is a circuit block schematic diagram of a driving device 100 for a light-emitting diode (LED) array 10 according to an embodiment of the disclosure. A scan circuit 110 of the driving device 100 can scan different scan lines of the LED array 10. The embodiment does not limit the scan method of the scan circuit 110. According to the actual design, the scan circuit 110 can use a well-known scan method or other scan methods to drive the different scan lines of the LED array 10.

In the embodiment shown in FIG. 1, the driving device 100 further includes a control circuit 120, a starting-position adjustment circuit 130, and a pulse-width modulation (PWM) circuit 140. According to different designs, in some embodiments, the control circuit 120, the starting-position adjustment circuit 130 and/or the PWM circuit 140 may be implemented as hardware circuits. In other embodiments, the implementation of the control circuit 120, the starting-position adjustment circuit 130 and/or the PWM circuit 140 may be hardware, firmware, or software (i.e., program), or a combination of more than one of the above-mentioned three implementations.

In terms of hardware, the control circuit 120, the starting-position adjustment circuit 130 and/or the PWM circuit 140 can be implemented as logic circuits on an integrated circuit. For example, the related functions of the control circuit 120, the starting-position adjustment circuit 130 and/or the PWM circuit 140 can be implemented in one or more hardware controllers, microcontrollers, hardware processors, microprocessors, application-specific integrated circuits (ASICs), digital signal processors (DSPs), field programmable gate arrays (FPGAs), central processing units (CPUs) and/or various logic blocks, modules, and circuits in other processing units. The related functions of the control circuit 120, the starting-position adjustment circuit 130 and/or the PWM circuit 140 can be implemented as hardware circuits using hardware description languages (such as Verilog HDL or VHDL) or other suitable programming languages, such as various logic blocks, modules, and circuits in integrated circuits.

In terms of software and/or firmware, the related functions of the control circuit 120, the starting-position adjustment circuit 130 and/or the PWM circuit 140 can be implemented as programming codes. For example, the control circuit 120, the starting-position adjustment circuit 130 and/or the PWM circuit 140 may be implemented using general programming languages (such as C, C++, or assembly language) or other suitable programming languages. The programming code can be recorded/stored in a "non-transitory machine-readable storage medium". In some embodiments, the non-transitory machine-readable storage medium includes, for example, a semiconductor memory and/or a storage device. The semiconductor memory includes a memory card, a read only memory (ROM), a flash memory, a programmable logic circuit, or other semiconductor memory. The storage device includes a hard disk drive (HDD), a solid-state drive (SSD), or other storage devices. The electronic device (such as a CPU, a hardware controller, a microcontroller, a hardware processor, or a microprocessor) can read and execute the programming code from the non-transitory machine-readable storage medium, thereby achieving the related functions of the control circuit 120, the starting-position adjustment circuit 130 and/or the PWM circuit 140.

The control circuit 120 determines the starting-position settings of different channels according to a frame counting value Frame_cnt and a scan line counting value Scan_cnt, such as the starting-position settings S2_1, S2_2, . . . , S2_*m* shown in FIG. 1. The number m of the starting-position settings S2_1 to S2_*m* can be any integer determined according to the actual design. The frame counting value Frame_cnt and the scan line counting value Scan_cnt may be well-known counting values, and thus will not be repeated herein. The frame counting value Frame_cnt can be used as the identification number of the current display frame period. Each display frame period is divided into a plurality of subframe periods, and each subframe period includes a plurality of scan line times respectively corresponding to a plurality of scan lines of the LED array 10. The scan circuit 110 can scan the plurality of scan lines of the LED array 10 in any subframe period, that is, a complete scan of the same group of scan lines can be repeated in these subframe periods. The scan line counting value Scan_cnt can be used as the identification number of the current scan line time in a subframe period.

The starting-position adjustment circuit 130 may receive a pulse-width modulation (PWM) counting value PWM_cnt from a counter (not shown in FIG. 1). Assuming that the value range of the PWM counting value PWM_cnt counts from x1 to x2, the starting value is x1. 1× and x2 are any integers determined by the actual design. In some embodiments, x1 is less than x2. In other embodiments, x1 is greater than x2. For example, assuming that the value range of the PWM counting value PWM_cnt counts from 0 to 65535, the starting value is 0.

The control circuit 120 is coupled to the starting-position adjustment circuit 130 to provide the starting-position settings S2_1 to S2_*m* adapted for different channels. The starting-position settings S2_1 to S2_*m* may indicate which subframe period of the same display frame period the starting values of adjusted counting values S3_1, S3_2, . . . , S3_*m* for pulse-width modulation (PWM) are located. The starting-position setting S2_1 is adapted for the first current channel of the LED array 10, the starting-position setting S2_2 is adapted for the second current channel of the LED array 10, and the starting-position setting S2_*m* is adapted for the m-th current channel of the LED array 10. Taking the starting-position setting S2_1 as an example, assuming that the starting-position setting S2_1 is "SF_1", it means that the starting value "x1" (e.g., 0) of the adjusted counting value S3_1 is located in in a first subframe period SF_1 of the display frame period. That is, the starting-position setting S2_1 can control the starting-position adjustment circuit 130 to change the starting position of the adjusted counting value S3_1.

Figure 2:
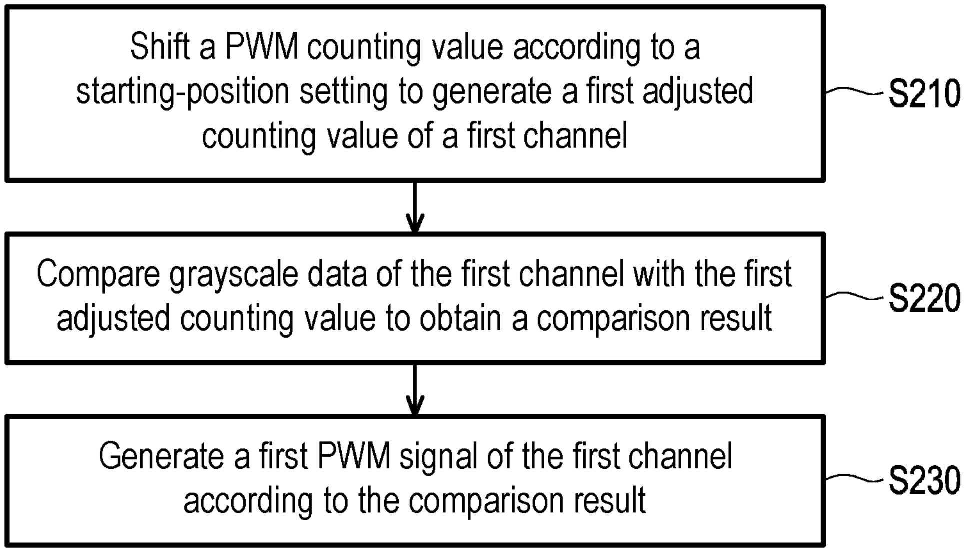
FIG. 2 is a schematic flowchart of a display driving method for an LED array according to an embodiment of the disclosure.

FIG. 2 is a schematic flowchart of a display driving method for the LED array 10 according to an embodiment of the disclosure. Referring to FIG. 1 and FIG. 2, in step S210, the starting-position adjustment circuit 130 shifts the PWM counting value PWM_cnt according to the starting-position settings S2_1 to S2_*m* to generate the adjusted counting values S3_1 to S3_*m* of different channels. Assuming that each display frame period is divided into n subframe periods, that the value range of the PWM counting value PWM_cnt counts from x1 to x2, and that the starting-position specified by the starting-position setting is the i-th subframe period (1≤i≤n) of the display frame period, the adjusted counting value is PWM_cnt+ (x2−x1+1)−[(n−i+1) *(x2−x1+1)/n)]=PWM_cnt+ (x2−x1+1)*[(i−1)/n)].

For example, assuming that the value range of the PWM counting value PWM_cnt counts from 0 to 65535 (that is, x1=0 and x2=65535), and that each display frame period is divided into 4 subframe periods (that is, n=4), the value range of the counting value is also divided into four sub value ranges "0 to 16383", "16384 to 32767", "32768 to 49151", and "49152 to 65535". When the starting-position setting S2_1 is "SF_1" (that is, i=1), the starting-position adjustment circuit 130 shifts the PWM counting value PWM_cnt to generate the adjusted counting value S3_1=PWM_cnt+(65535−0+1)*[(1−1)/4)]=PWM_cnt of a first channel CH_1. When the starting-position setting S2_1 is "SF_2" (that is, i=2), the starting-position adjustment circuit 130 shifts the PWM counting value PWM_cnt to generate the adjusted counting value S3_1=PWM_cnt+ (65535−0+1)*[(2−1)/4)]=PWM_cnt+16384 of the first channel CH_1. When the adjusted counting value S3_1 counts to the maximum value "x2" and an overflow occurs, the adjusted counting value S3_1 will return to the starting value "x1" and continue counting. Other starting-position settings S2_2 to S2_*m*, other adjusted counting values S3_2 to S3_*m*, and other channels CH_2, . . . , CH_m may be deduced by referring to the relevant descriptions of the starting-position setting S2_1, the adjusted counting value S3_1, and the channel CH_1, and thus will not be repeated herein.

The PWM circuit 140 is coupled to the starting-position adjustment circuit 130 to receive the adjusted counting values S3_1 to S3_*m*. In step S220, the PWM circuit 140 respectively compares grayscale data D_1, D_2, . . . , D_m of different channels CH_1 to CH_m with the adjusted counting values S3_1 to S3_*m* to obtain the comparison result. In step S230, the PWM circuit 140 generates PWM signals PWM_1, PWM_2, . . . , PWM_m of the channels CH_1 to CH_m according to the comparison result. For example, the PWM circuit 140 compares the grayscale data D_1 of the channel CH_1 with the adjusted counting value S3_1, and then generates the PWM signal PWM_1 of the channel CH_1 according to the comparison result. For a certain target scan line of the LED array 10, assuming that the value range of the adjusted counting value S3_1 counts from 0 to 65535, and that the grayscale data D_1 is 1 (a low grayscale), during the period when the value of the adjusted counting value S3_1 is 0, the PWM signal PWM_1 is a first logic level (e.g., a high level), and during the period when the value of the adjusted counting value S3_1 is 1 to 65535, the PWM signal PWM_1 is a second logic level (e.g., a low level). Therefore, the pulse width of the PWM signal PWM_1 can correspond to the grayscale data D_1. Other grayscale data D_2 to D_m, other adjusted counting values S3_2 to S3_*m*, and other PWM signals PWM_2 to PWM_m may be deduced by referring to the relevant descriptions of the grayscale data D_1, the adjusted counting value S3_1, and the PWM signal PWM_1, and thus will not be repeated herein.

To sum up, based on the dynamic changes of the starting-position settings S2_1 to S2_*m*, the starting-position adjustment circuit 130 can disperse the starting positions of different LED pixels in the same display frame period, and/or disperse the starting position of a same LED pixel in different display frame periods. Therefore, during the low-grayscale display, the LED pixels at different positions can be lit up in different subframe periods of the same display frame period to increase the spatial refresh rate. In addition, the same LED pixel can be lit up in different subframe periods of different display frame periods. Therefore, the driving device 100 can reduce the flicker of the LED array 10 and reduce the phenomenon of horizontal and vertical lines.

Figure 3:
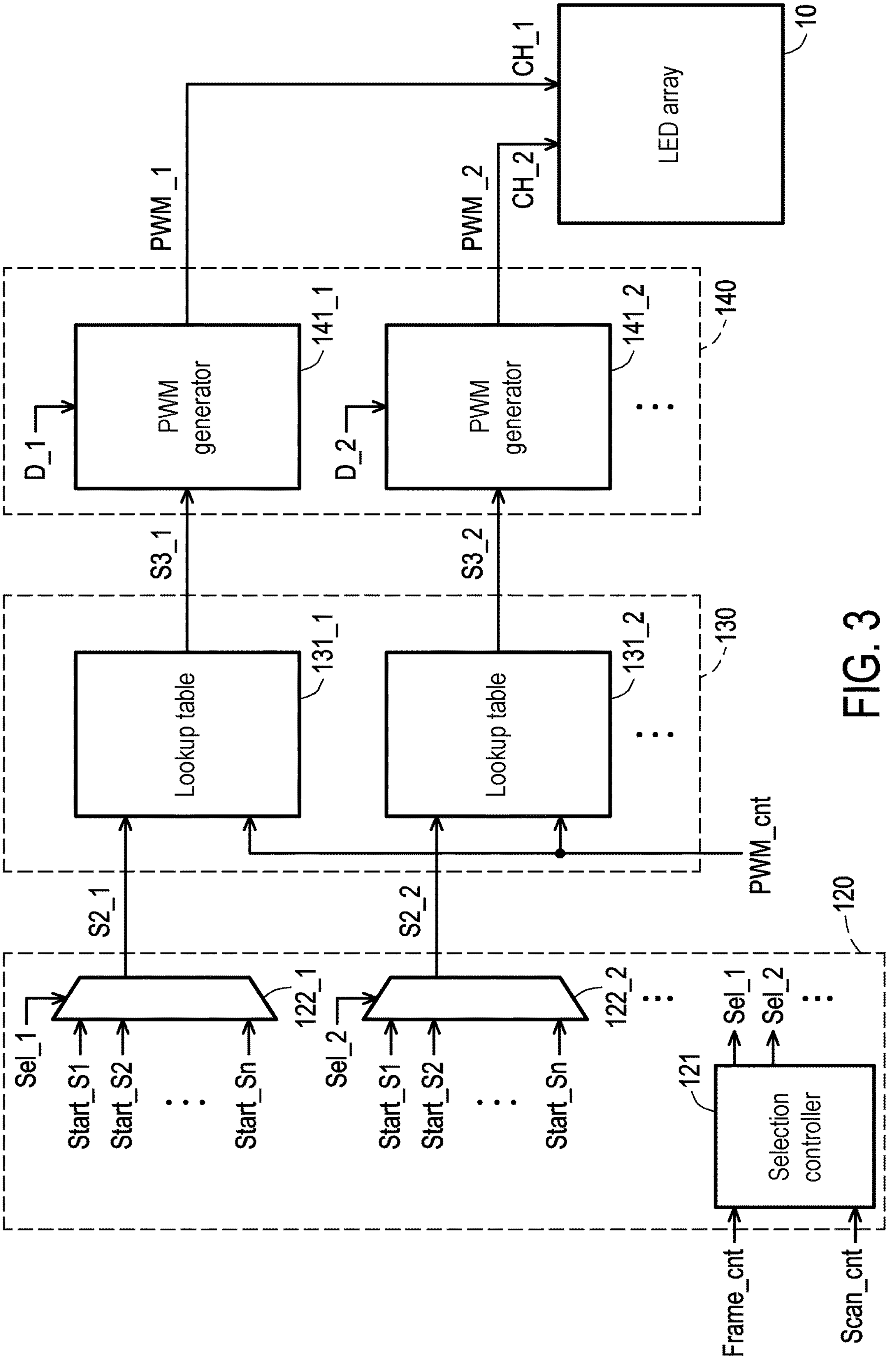
FIG. 3 is a circuit block schematic diagram of a control circuit, a starting-position adjustment circuit, and a PWM circuit according to an embodiment of the disclosure.

FIG. 3 is a schematic circuit block diagram of the control circuit 120, the starting-position adjustment circuit 130, and the PWM circuit 140 according to an embodiment of the disclosure. The control circuit 120 shown in FIG. 3 can be used as one of many implementation examples of the control circuit 120 shown in FIG. 1. In the embodiment shown in FIG. 3, the control circuit 120 includes a selection controller 121 and a plurality of multiplexers (e.g., multiplexers 122_1 and 122_2 shown in FIG. 3). The selection controller 121 generates selection signals corresponding to the different channels CH_1 to CH_m (e.g., selection signals Sel_1 and Sel_2 shown in FIG. 3) according to the frame counting value Frame_cnt and the scan line counting value Scan_cnt.

The multiplexer 122_1 is coupled to the selection controller 121 to receive the selection signal Sel_1. In the embodiment shown in FIG. 3, it is assumed that each display frame period is divided into n subframe periods. The multiplexer 122_1 selects one from a plurality of starting subframe settings Start_S1, Start_S2, . . . , Start_Sn as the starting-position setting S2_1 according to the selection signal Sel_1. The starting subframe setting Start_S1 means that "the starting-position is in the first subframe period SF_1 of the display frame period" (the starting value "x1" (e.g., 0) of the counting value is located in in the first subframe period SF_1), the starting subframe setting Start_S2 means that "the starting-position is in the second subframe period SF_2 of the display frame period", and the starting subframe setting Start_Sn means that "the starting-position is in the n-th subframe period SF_n of the display frame period". The multiplexer 122_1 provides the starting-position setting S2_1 to the starting-position adjustment circuit 130. The multiplexer 122_2 is coupled to the selection controller 121 to receive the selection signal Sel_2. The multiplexer 122_2 selects one of the plurality of starting subframe settings Start_S1 to Start_Sn as the starting-position setting S2_2 according to the selection signal Sel_2. The multiplexer 122_2 provides the starting-position setting S2_2 to the starting-position adjustment circuit 130.

The starting-position adjustment circuit 130 shown in FIG. 3 can be used as one of many implementation examples of the starting-position adjustment circuit 130 shown in FIG. 1. In the embodiment shown in FIG. 3, the starting-position adjustment circuit 130 includes a plurality of lookup tables (such as lookup tables 131_1 and 131_2 shown in FIG. 3). The lookup table 131_1 may receive the PWM counting value PWM_cnt from a counter (not shown in FIG. 3). By means of a table lookup, the lookup table 131_1 can determine the shift amount (a first shift amount) according to the starting-position setting S2_1. The relationship between the starting-position setting S2_1 and the first shift amount can be predefined in the lookup table 131_1 according to the actual design. For example (but not limited thereto), assuming that each display frame period is divided into n subframe periods, and that the value range of the PWM counting value PWM_cnt counts from x1 to x2, and that the starting-position specified by the starting-position setting S2_1 is the i-th subframe period ($1 \le i \le n$) of the display frame period, the shift amount is (x2−x1+1)*[(i−1)/n)]. The lookup table 131_1 may shift the PWM counting value PWM_cnt according to the first shift amount to generate the adjusted counting value S3_1 of the channel CH_1 to the PWM circuit 140.

For example, assume that the value range of the PWM counting value PWM_cnt counts from 0 to 65535 (that is, x1=0 and x2=65535), and that each display frame period is divided into 4 subframe periods (that is, n=4). When the starting-position setting S2_1 is "SF_1" (that is, i=1), the lookup table 131_1 shifts the PWM counting value PWM_cnt according to the first shift amount "(65535-0+1)*[(1-1)/4)]=0" to generate the adjusted counting value S3_1=PWM_cnt+0=PWM_cnt of channel CH_1. When the starting-position setting S2_1 is "SF_2" (that is, i=2), the lookup table 131_1 shifts the PWM counting value PWM_cnt according to the first shift amount "(65535-0+1)*[(2-1)/4)]=16384" to generate an adjusted counting value S3_1=PWM_cnt+16384 of channel CH_1.

The lookup table 131_2 receives the PWM counting value PWM_cnt. By means of a table lookup, the lookup table 131_2 can determine the shift amount (a second shift amount) according to the starting-position setting S2_2. The relationship between the starting-position setting S2_2 and the second shift amount can be predefined in the lookup table 131_2 according to the actual design. The lookup table 131_2 may shift the PWM counting value PWM_cnt according to the second shift amount to generate the adjusted counting value S3_2 of the channel CH_2 to the PWM circuit 140. The lookup table 131_2 may be deduced by referring to the relevant description of the lookup table 131_1, and thus will not be repeated herein.

The PWM circuit 140 shown in FIG. 3 can be used as one of many implementation examples of the PWM circuit 140 shown in FIG. 1. In the embodiment shown in FIG. 3, the PWM circuit 140 includes a plurality of pulse-width modulation (PWM) generators (such as PWM generators 141_1 and 141_2 shown in FIG. 3). The PWM generator 141_1 is coupled to the starting-position adjustment circuit 130 to receive the adjusted counting value S3_1. The PWM generator 141_1 compares the grayscale data D_1 of the channel CH_1 with the adjusted counting value S3_1 and generates the PWM signal PWM_1 of the channel CH_1 according to the comparison result. For example, for a certain target scan line of the LED array 10, assuming that the value range of the adjusted counting value S3_1 counts from 0 to 65535, and that the grayscale data D_1 is 1 (a low grayscale), during the period when the value of the adjusted counting value S3_1 is 0, the PWM signal PWM_1 is a first logic level (e.g., a high level), and during the period when the value of the adjusted counting value S3_1 is 1 to 65535, the PWM signal PWM_1 is a second logic level (e.g., a low level). Therefore, the pulse width of the PWM signal PWM_1 can correspond to the grayscale data D_1.

The PWM generator 141_2 is coupled to the starting-position adjustment circuit 130 to receive the adjusted counting value S3_2. The PWM generator 141_2 compares the grayscale data D_2 of the channel CH_2 with the adjusted counting value S3_2 and generates the PWM signal PWM_2 of the channel CH_2 according to the comparison result. The PWM generator 141_2 may be deduced by referring to the relevant description of the PWM generator 141_1, and thus will not be repeated herein.

Figure 4:
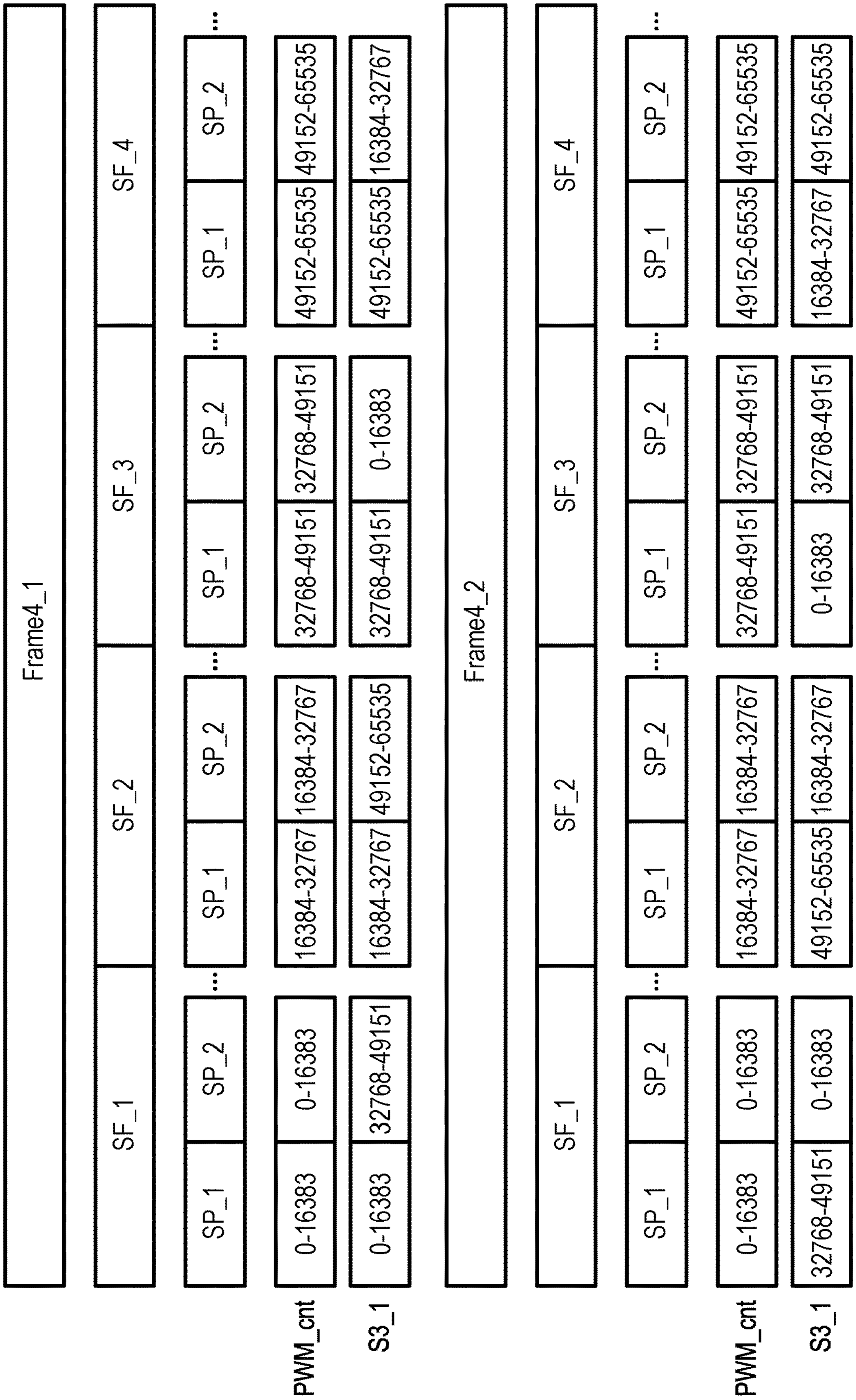
FIG. 4 is a schematic diagram of an adjusted counting value of a channel at different scan line times according to an embodiment of the disclosure.

FIG. 4 is a schematic diagram of the adjusted counting value S3_1 of the channel CH_1 at different scan line times according to an embodiment of the disclosure. FIG. 4 illustrates two consecutive display frame periods Frame4_1 and Frame4_2. Each display frame period is divided into a plurality of subframe periods, such as the subframe periods SF_1, SF_2, SF_3, and SF_4 shown in FIG. 4. It should be noted that the number of subframe periods of a display frame period can be determined according to the actual design. Each subframe period includes a plurality of scan line times respectively corresponding to the plurality of scan lines of the LED array 10, such as the scan line times SP_1, SP_2, . . . shown in FIG. 4.

In the embodiment shown in FIG. 4, the lookup table 131_1 shown in FIG. 3 will be used as an illustration example. Other lookup tables (such as the lookup table 131_2) may be deduced by referring to the relevant description of the lookup table 131_1, and thus will not be repeated herein. Referring to FIG. 3 and FIG. 4, the lookup table 131_1 can receive the PWM counting value PWM_cnt from the counter (not shown in FIG. 3). By means of a table lookup, the lookup table 131_1 can shift the PWM counting value PWM_cnt according to the starting-position setting S2_1 to generate the adjusted counting value S3_1 of the channel CH_1 to the PWM circuit 140.

For example, assume that the starting-position setting S2_1 in the display frame period Frame4_1 indicates that the starting position of a certain scan line (the scan line time SP_1) of the LED array 10 is in the subframe period SF_1, and that the starting position of another scan line (the scan line time SP_2) of the LED array 10 is in the subframe period SF_3. In the embodiment shown in FIG. 4, the value range of the PWM counting value PWM_cnt is assumed to count from 0 to 65535 (as shown in FIG. 4). When the starting position S2_1 of the scan line time SP_1 is "SF_1", the lookup table 131_1 shifts the PWM counting value PWM_cnt according to the shift amount "0" to generate the adjusted counting value S3_1=PWM_cnt+0=PWM_cnt of the channel CH_1. Therefore, in the display frame period Frame4_1, the starting position of the scan line time SP_1 is maintained in the subframe period SF_1. When the starting position S2_1 of the scan line time SP_2 is "SF_3", the lookup table 131_1 shifts the PWM counting value PWM_cnt according to the shift amount "32768" to generate the adjusted counting value S3_1=PWM_cnt+32768 of the channel CH_1. Therefore, in the display frame period Frame4_1, the starting position of the scan line time SP_2 is moved to the subframe period SF_3.

In the same way, assume that the starting-position setting S2_1 in the display frame period Frame4_2 indicates that the starting position of a certain scan line (the scan line time SP_1) of the LED array 10 is in the subframe period SF_3, and that the starting position of another scan line (the scan line time SP_2) of the LED array 10 is in the subframe period SF_1. When the starting-position setting S2_1 of the scan line time SP_1 is "SF_3", the lookup table 131_1 shifts the PWM counting value PWM_cnt to generate the adjusted counting value S3_1=PWM_cnt+32768 of the channel CH_1. Therefore, in the display frame period Frame4_2, the starting position of the scan line time SP_1 is moved to the subframe period SF_3. When the starting-position setting S2_1 of the scan line time SP_2 is "SF_1", the lookup table 131_1 shifts the PWM counting value PWM_cnt to generate the adjusted counting value S3_1=PWM_cnt+0=PWM_cnt of the channel CH_1. Therefore, in the display frame period Frame4_2, the starting position of the scan line time SP_2 is maintained in the subframe period SF_1.

Figure 5:
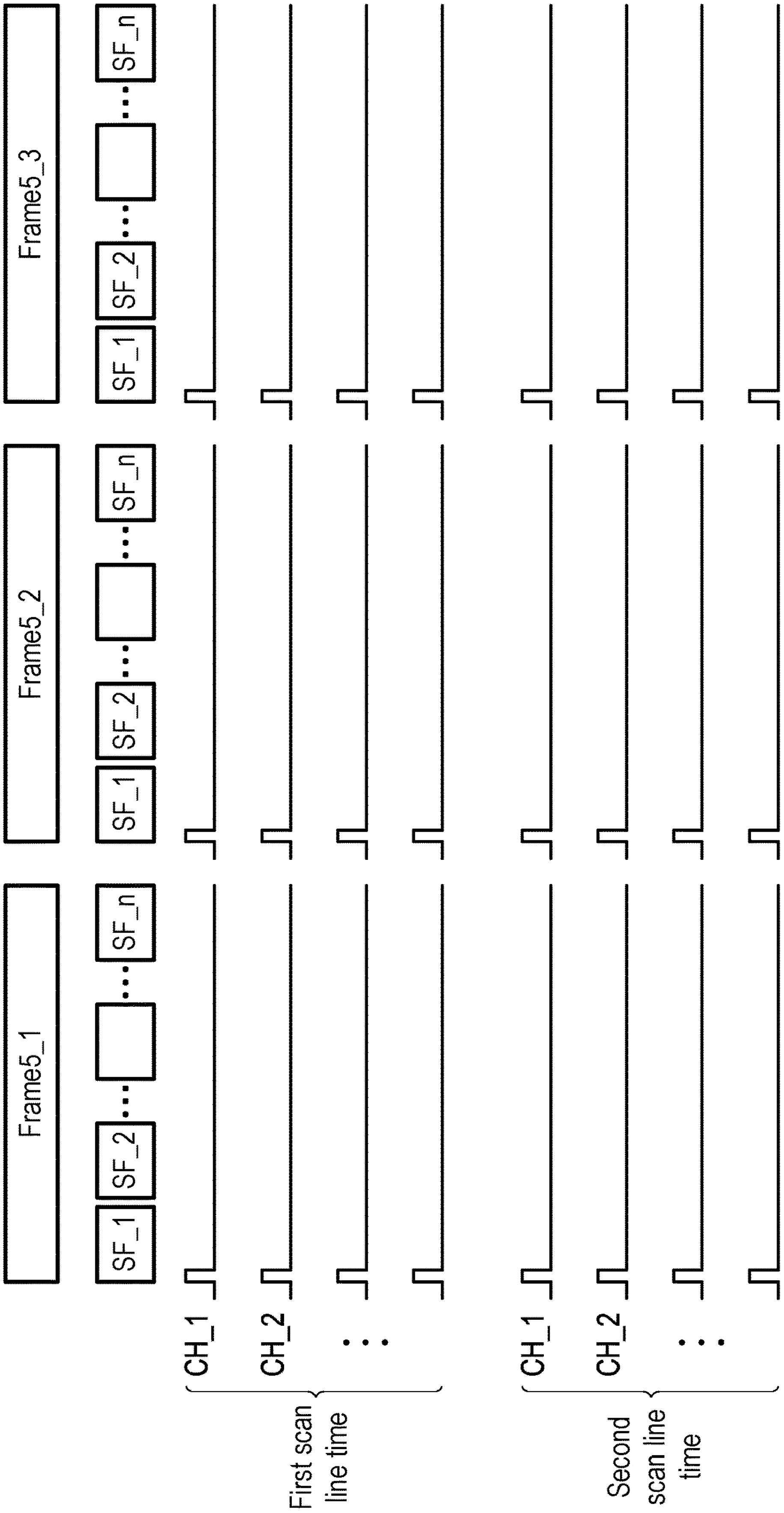
FIG. 5 is a schematic diagram of starting positions of different channels at different scan line times according to an embodiment.

FIG. 5 is a schematic diagram of the starting positions of different channels CH_1 to CH_m at different scan line times according to an embodiment. FIG. 5 illustrates three consecutive display frame periods Frame5_1, Frame5_2 and Frame5_3. Each display frame period is divided into a plurality of subframe periods, such as the subframe periods SF_1, SF_2, . . . , SF_n shown in FIG. 5. Each subframe period includes a plurality of scan line times respectively corresponding to the plurality of scan lines of the LED array 10. FIG. 5 illustrates a first scan line time and a second scan line time. Each "pulse" (convex upward curve) shown in FIG. 5 indicates the starting position. In the implementation scenario shown in FIG. 5, it is assumed that the starting-position adjustment circuit 130 is disabled, that is, the starting-position adjustment circuit 130 does not change the starting positions of the adjusted counting values S3_1 to S3_m. In such a situation, as shown in FIG. 5, the starting positions of different channels CH_1 to CH_m at different scan line times are all in the subframe period SF_1.

During the low grayscale display, the duty width of the PWM signal is too narrow such that the duty width indicating the low grayscale is not sufficient to be segmented in all subframes SF_1 to SF_n. In an extreme case, the duty width indicating the lowest grayscale can only be placed in the first subframe period SF_1 of the display frame period. Assuming that all LED pixels of the LED array 10 are at the lowest grayscale, each LED pixel will only be lit up in the first subframe period SF_1 of each display frame period (the time length of lighting corresponds to the lowest grayscale), and will not be lit up in other subframe periods SF_2 to SF_n of each display frame period. Therefore, the refresh rate of the LED will be reduced during the low grayscale display. In addition, since the starting positions of all LED pixels are the same in each display frame period, and the starting position of any LED pixel remains the same in different display frames, all LED pixels (the lowest grayscale) of the LED array 10 are all lit up in the same subframe period SF_1. Such a picture is prone to incur undesirable visual effects such as flicker and horizontal and vertical lines.

Figure 6:
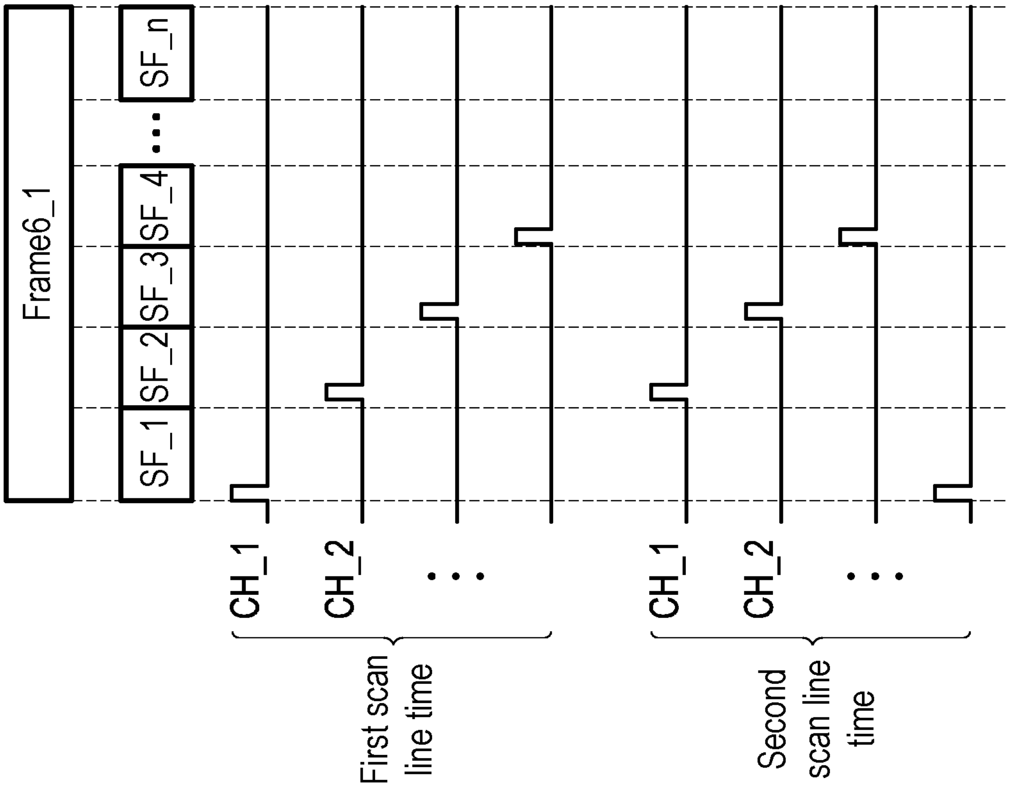
FIG. 6 is a schematic diagram of starting positions of different channels at different scan line times according to an embodiment of the disclosure.

FIG. 6 is a schematic diagram of starting positions of different channels CH_1 to CH_m at different scan line times according to an embodiment of the disclosure. FIG. 6 illustrates a display frame period Frame6_1, which is divided into a plurality of subframe periods SF_1, SF_2, SF_3, SF_4, . . . , SF_n. Each subframe period includes a plurality of scan line times corresponding to the plurality of scan lines of the LED array 10. FIG. 6 illustrates a first scan line time and a second scan line time. Each "pulse" (convex upward curve) shown in FIG. 6 indicates the starting position. In the implementation scenario shown in FIG. 6, the starting-position adjustment circuit 130 is enabled, that is, the starting-position adjustment circuit 130 can dynamically change the starting positions of the adjusted counting values S3_1 to S3_m based on the control of the control circuit 120. In such a situation, the starting positions of different channels CH_1 to CH_m at the same scan line time can be dispersed in the different subframe periods of the display frame period Frame6_1, and/or the starting positions of the same channel at different scan line times can be dispersed in the different subframe periods of the display frame period Frame6_1.

For channel CH_1, in the same display frame period Frame6_1, the starting-position adjustment circuit 130 can make the starting-position (a first starting position) corresponding to the first scan line time (the scan time corresponding to the first scan line of the LED array 10) different from the starting-position (a second starting position) corresponding to the second scan line time (the scan time corresponding to the first scan line of the LED array 10). The first starting position indicates which subframe period of the same display frame period Frame6_1 the starting value of the adjusted counting value S3_1 of the first scan line is located in (in the example of FIG. 6, the first starting position of the channel CH_1 at the first scan line time indicates that "the starting position is in the subframe period SF_1"). The second starting position indicates which subframe period of the same display frame period Frame6_1 the starting value of the adjusted counting value S3_1 of the second scan line is located in (in the example of FIG. 6, the second starting position of the channel CH_1 at the second scan line time indicates that "the starting-position is in the subframe period SF_2").

For the first scan line of the LED array 10, in the first scan line time, the starting-position adjustment circuit 130 can make the first starting position of the channel CH_1 in the display frame period Frame6_1 different from the second starting position of the channel CH_2 in the display frame period Frame6_1. The first starting position indicates which subframe period of the display frame period Frame6_1 the starting value of the adjusted counting value S3_1 of the same scan line is located in (in the example of FIG. 6, the first starting position of the channel CH_1 at the first scan line time indicates that "the starting-position is in the subframe period SF_1"). The second starting position indicates which subframe period of the display frame period Frame6_1 the starting value of the adjusted counting value S3_2 of the same scan line is located in (in the example of FIG. 6, the second starting position of the channel CH_2 at the first scan line time indicates that "the starting-position is in the subframe period SF_2").

Figure 7:
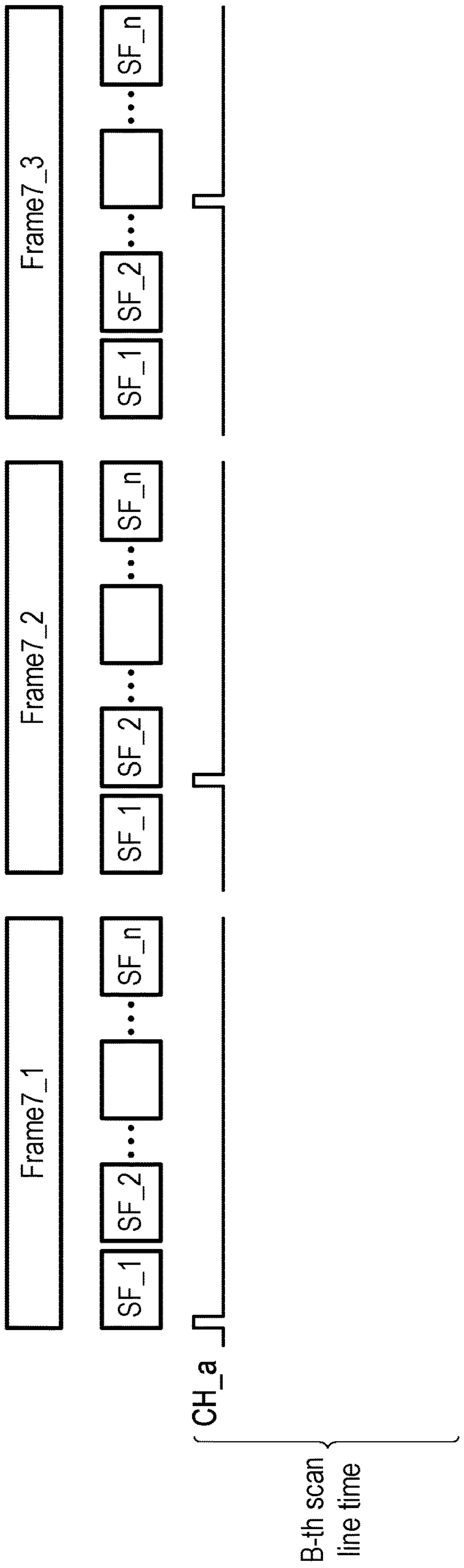
FIG. 7 is a schematic diagram of starting-positions of a same channel at a same scan line time according to another embodiment of the disclosure.

FIG. 7 is a schematic diagram of the starting-positions of a same channel CH_a at the same scan line time according to another embodiment of the disclosure. The channel CH_a shown in FIG. 7 may be any one of the channels CH_1 to CH_m shown in FIG. 1. FIG. 7 illustrates three display frame periods Frame7_1, Frame7_2, and Frame7_3, in which each display frame period is divided into a plurality of subframe periods SF_1 to SF_n. Each subframe period includes a plurality of scan line times corresponding to the plurality of scan lines of the LED array 10. The b-th scan line time shown in FIG. 7 may be any one of the plurality of scan line times. In the implementation scenario shown in FIG. 7, the starting-position adjustment circuit 130 can dynamically change the starting positions of the adjusted counting values S3_1 to S3_m based on the control of the control circuit 120. In the situation shown in FIG. 7, the starting positions of the same channel CH_a at the same scan line time can be dispersed in the different subframe periods of the different display frame periods.

For the same scan line (the target scan line) among the plurality of scan lines of the LED array 10, the starting-position adjustment circuit 130 can make the first starting position of the channel CH_a in the display frame period Frame7_1 different from the second starting position of the channel CH_a in the display frame period Frame7_2. The first starting position indicates which subframe period of the display frame period Frame7_1 the starting value of an adjusted counting value S3_a(S3_a can be any one of S3_1 to S3_*m*) of the same target scan line is located in (in the example of FIG. 7, the first starting position of the channel CH_a at the b-th scan line time indicates that "the starting-position in the display frame period Frame7_1 is in the subframe period SF_1"). The second starting position indicates which subframe period of the display frame period Frame7_2 the starting value of the adjusted counting value S3_*a* of the same target scan line is located in (in the example of FIG. 7, the second starting position of the channel CH_a at the b-th scan line time indicates that "the starting-position in the display frame period Frame7_2 is in the subframe period SF_2").

Figure 8:
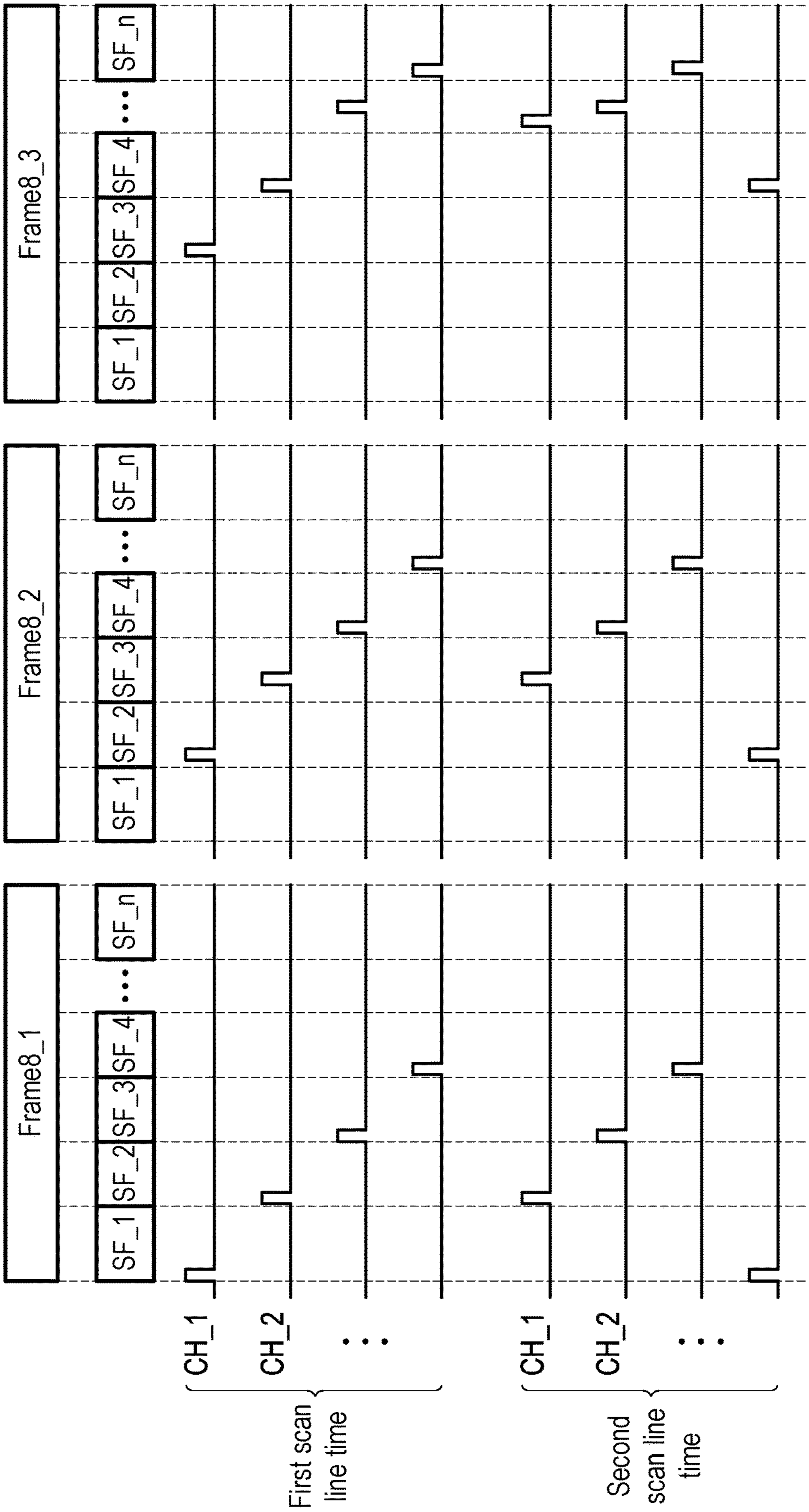
FIG. 8 is a schematic diagram of starting positions of different channels at different scan line times according to yet another embodiment of the disclosure.

FIG. 8 is a schematic diagram of the starting positions of the different channels CH_1 to CH_m at the different scan line times according to yet another embodiment of the disclosure. FIG. 8 illustrates three display frame periods Frame8_1, Frame8_2, and Frame8_3, in which each display frame period is divided into a plurality of subframe periods SF_1 to SF_n. Each subframe period includes a plurality of scan line times corresponding to the plurality of scan lines of the LED array 10. FIG. 8 illustrates a first scan line time and a second scan line time. In the implementation scenario shown in FIG. 8, the starting-position adjustment circuit 130 can dynamically change the starting positions of the adjusted counting values S3_1 to S3_*m* based on the control of the control circuit 120. In such a situation, the starting positions of the different channels CH_1 to CH_m at the same scan line time can be dispersed in the different subframe periods of the display frame period Frame8_1, and/or the starting positions of the same channel at the different scan line times can be dispersed in the different subframe periods of the display frame period Frame8_1, and/or the starting positions of the same channel at the same scan line time can be dispersed in the different subframe periods of the different display frame periods. The embodiment shown in FIG. 8 may be deduced by referring to FIG. 6 and the relevant descriptions of FIG. 6, and thus will not be repeated herein.

Although the disclosure has been described with reference to the embodiments above, the embodiments are not intended to limit the disclosure. Any person skilled in the art can make some changes and modifications without departing from the spirit and scope of the disclosure. Therefore, the scope of the disclosure will be defined in the appended claims.

What is claimed is:

1. A driving device for a light-emitting diode array, comprising:

a starting-position adjustment circuit, configured to receive a pulse-width modulation counting value, and configured to shift the pulse-width modulation counting value according to a first starting-position setting to generate a first adjusted counting value of a first channel, wherein each display frame period is divided into a plurality of subframe periods, each subframe period comprises a plurality of scan line times respectively corresponding to a plurality of scan lines of the light-emitting diode array, and the first starting-position setting is configured to indicate which one of the subframe periods in a same display frame period a starting value of the first adjusted counting value is located in; and a pulse-width modulation circuit, coupled to the starting-position adjustment circuit to receive the first adjusted counting value, wherein the pulse-width modulation circuit compares grayscale data of the first channel with the first adjusted counting value to obtain a first comparison result, and the pulse-width modulation circuit generates a first pulse-width modulation signal of the first channel according to the first comparison result.

2. The driving device according to claim 1, wherein the starting-position adjustment circuit makes a first starting position of the first channel in a first display frame period different from a second starting position of the first channel in a second display frame period for a same scan line among the scan lines, the first starting position indicates which subframe period of the first display frame period the starting value of the first adjusted counting value of the same scan line is located in, and the second starting position indicates which subframe period of the second display frame period the starting value of the first adjusted counting value of the same scan line is located in.

3. The driving device according to claim 1, wherein the scan lines comprise a first scan line and a second scan line, the starting-position adjustment circuit makes a first starting position corresponding to the first scan line different from a second starting position corresponding to the second scan line in a same display frame period for the first channel, the first starting position indicates which subframe period of the same display frame period the starting value of the first adjusted counting value of the first scan line is located in, and the second starting position indicates which subframe period of the same display frame period the starting value of the first adjusted counting value of the second scan line is located in.

4. The driving device according to claim 1, wherein the starting-position adjustment circuit shifts the pulse-width modulation counting value according to a second starting-position setting to generate a second adjusted counting value of a second channel, the second starting-position setting is configured to indicate which one of the subframe periods in a same display frame period a starting value of the second adjusted counting value is located in, the starting-position adjustment circuit makes a first starting position of the first channel in a first display frame period different from a second starting position of the second channel in the first display frame period for a same scan line among the scan lines, the first starting position indicates which subframe period of the first display frame period the starting value of the first adjusted counting value of the same scan line is located in, and the second starting position indicates which subframe period of the first display frame period the starting value of the second adjusted counting value of the same scan line is located in.

5. The driving device according to claim 1, wherein the starting-position adjustment circuit comprises:

a first lookup table, configured to receive the pulse-width modulation counting value, and configured to determine a first shift amount according to the first starting-position setting, wherein the first shift amount is configured to shift the pulse-width modulation counting value to generate the first adjusted counting value of the first channel to the pulse-width modulation circuit.

6. The driving device according to claim 5, wherein the starting-position adjustment circuit further comprises:

a second lookup table, configured to receive the pulse-width modulation counting value, and configured to determine a second shift amount according to a second starting-position setting, wherein the second starting-position setting is configured to indicate which one of the subframe periods in the same display frame period a starting value of a second adjusted counting value is located in, and the second shift amount is configured to shift the pulse-width modulation counting value to generate the second adjusted counting value of a second channel to the pulse-width modulation circuit.

7. The driving device according to claim 1, wherein the pulse-width modulation circuit comprises:

a first pulse-width modulation generator, coupled to the starting-position adjustment circuit to receive the first adjusted counting value, wherein the first pulse-width modulation generator compares the grayscale data of the first channel with the first adjusted counting value to obtain the first comparison result, and the first pulse-width modulation generator generates the first pulse-width modulation signal of the first channel according to the first comparison result.

8. The driving device according to claim 7, wherein the pulse-width modulation circuit further comprises:

a second pulse-width modulation generator, coupled to the starting-position adjustment circuit to receive a second adjusted counting value, wherein the starting-position adjustment circuit shifts the pulse-width modulation counting value according to a second starting-position setting to generate the second adjusted counting value of a second channel, the second starting-position setting is configured to indicate which one of the subframe periods in a same display frame period a starting value of the second adjusted counting value is located in, the second pulse-width modulation generator compares grayscale data of the second channel with the second adjusted counting value to obtain a second comparison result, and the second pulse-width modulation generator generates a second pulse-width modulation signal of the second channel according to the second comparison result.

9. The driving device according to claim 1, further comprising:

a control circuit, coupled to the starting-position adjustment circuit to provide the first starting-position setting, wherein the control circuit determines the first starting-position setting according to a frame counting value and a scan line counting value.

10. The driving device according to claim 9, wherein the control circuit comprises:

a selection controller, configured to generate a first selection signal according to the frame counting value and the scan line counting value; and a first multiplexer, coupled to the selection controller to receive the first selection signal, wherein the first multiplexer selects one from a plurality of starting subframe settings as the first starting-position setting according to the first selection signal, and the first multiplexer provides the first starting-position setting to the starting-position adjustment circuit.

11. The driving device according to claim 9, wherein the control circuit further determines a second starting-position setting according to the frame counting value and the scan line counting value, the starting-position adjustment circuit shifts the pulse-width modulation counting value according to the second starting-position setting to generate a second adjusted counting value of a second channel, the second starting-position setting is configured to indicate which one of the subframe periods in a same display frame period a starting value of the second adjusted counting value is located in, the pulse-width modulation circuit compares grayscale data of the second channel with the second adjusted counting value to obtain a second comparison result, and the pulse-width modulation circuit generates a second pulse-width modulation signal of the second channel according to the second comparison result.

12. The driving device according to claim 11, wherein the control circuit comprises:

a selection controller, configured to generate a first selection signal and a second selection signal according to the frame counting value and the scan line counting value;

a first multiplexer, coupled to the selection controller to receive the first selection signal, wherein the first multiplexer selects one from a plurality of starting subframe settings as the first starting-position setting according to the first selection signal, and the first multiplexer provides the first starting-position setting to the starting-position adjustment circuit; and a second multiplexer, coupled to the selection controller to receive the second selection signal, wherein the second multiplexer selects one from the plurality of starting subframe settings as the second starting-position setting according to the second selection signal, and the second multiplexer provides the second starting-position setting to the starting-position adjustment circuit.

13. A display driving method for a light-emitting diode array, comprising:

shifting a pulse-width modulation counting value according to a first starting-position setting by a starting-position adjustment circuit to generate a first adjusted counting value of a first channel, wherein each display frame period is divided into a plurality of subframe periods, each subframe period comprises a plurality of scan line times respectively corresponding to a plurality of scan lines of the light-emitting diode array, and the first starting-position setting is configured to indicate which one of the subframe periods in a same display frame period a starting value of the first adjusted counting value is located in;

comparing grayscale data of the first channel with the first adjusted counting value by a pulse-width modulation circuit to obtain a comparison result; and generating a first pulse-width modulation signal of the first channel according to the comparison result by the pulse-width modulation circuit.

14. The display driving method according to claim 13, further comprising:

making a first starting position of the first channel in a first display frame period different from a second starting position of the first channel in a second display frame period by the starting-position adjustment circuit for a same scan line among the scan lines, wherein the first starting position indicates which subframe period of the first display frame period the starting value of the first adjusted counting value of the same scan line is located in, and the second starting position indicates which subframe period of the second display frame period the starting value of the first adjusted counting value of the same scan line is located in.

15. The display driving method according to claim 13, wherein the scan lines comprise a first scan line and a second scan line, and the display driving method further comprises:

making a first starting position corresponding to the first scan line different from a second starting position corresponding to the second scan line in a same display frame period by the starting-position adjustment circuit for the first channel, wherein the first starting position indicates which subframe period of the same display frame period the starting value of the first adjusted counting value of the first scan line is located in, and the second starting position indicates which subframe period of the same display frame period the starting value of the first adjusted counting value of the second scan line is located in.

16. The display driving method according to claim 13, wherein shifting the pulse-width modulation counting value according to a second starting-position setting by the starting-position adjustment circuit to generate a second adjusted counting value of a second channel, wherein the second starting-position setting is configured to indicate which one of the subframe periods in a same display frame period a starting value of the second adjusted counting value is located in; and making a first starting position of the first channel in a first display frame period different from a second starting position of the second channel in the first display frame period by the starting-position adjustment circuit for a same scan line among the scan lines, wherein the first starting position indicates which subframe period of the first display frame period the starting value of the first adjusted counting value of the same scan line is located in, and the second starting position indicates which subframe period of the first display frame period the starting value of the second adjusted counting value of the same scan line is located in.

* * * * *